Figure 1:
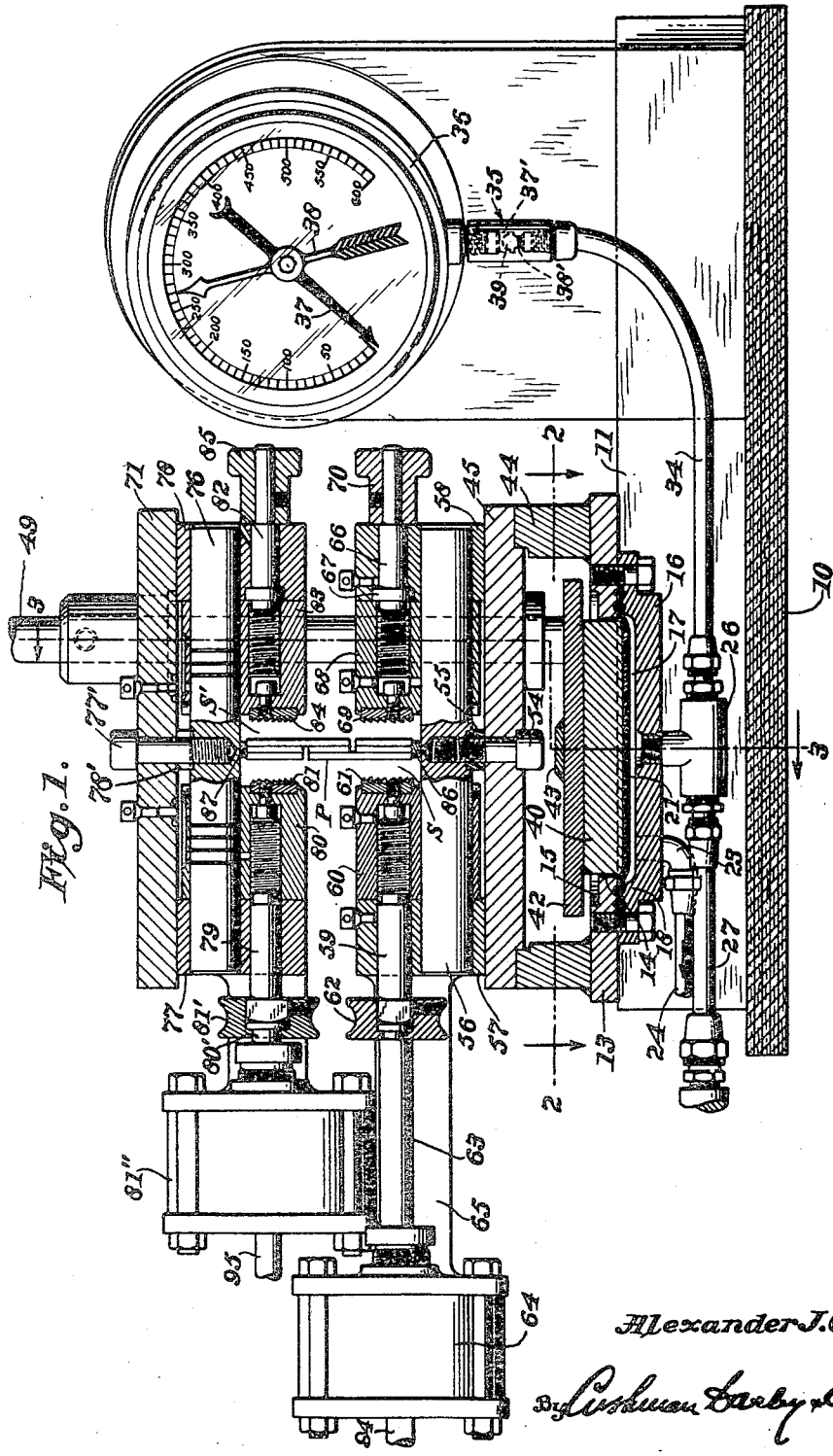

Aug. 19, 1947.　　　A. J. GOLICK　　　2,425,931
HYDRAULIC TENSILE TESTING MACHINE
Filed Oct. 19, 1945　　　3 Sheets-Sheet 1

Inventor:
Alexander J. Golick,
By Cushman Darby & Cushman
Attorneys

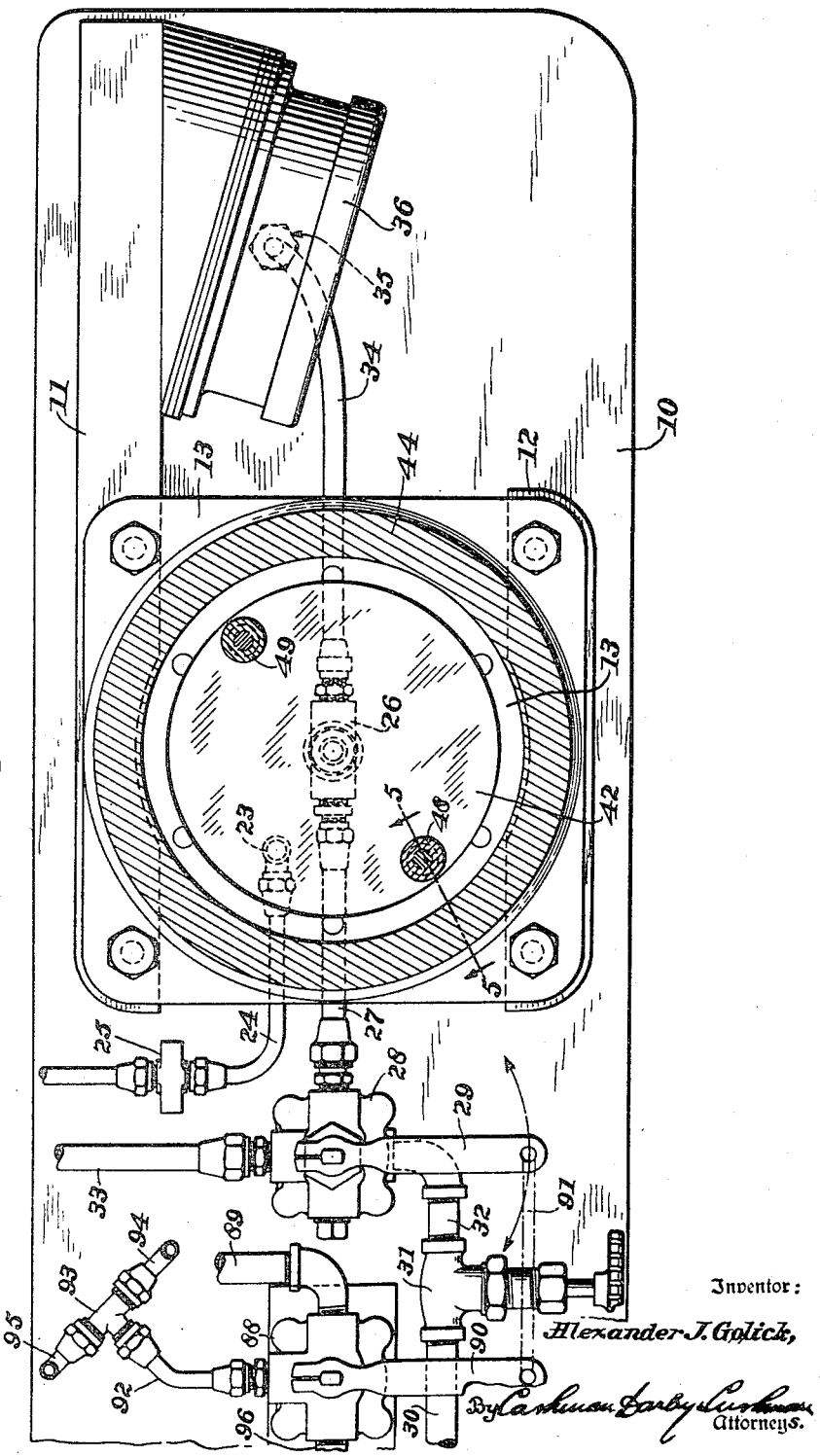

Aug. 19, 1947.  A. J. GOLICK  2,425,931
HYDRAULIC TENSILE TESTING MACHINE
Filed Oct. 19, 1945  3 Sheets-Sheet 3
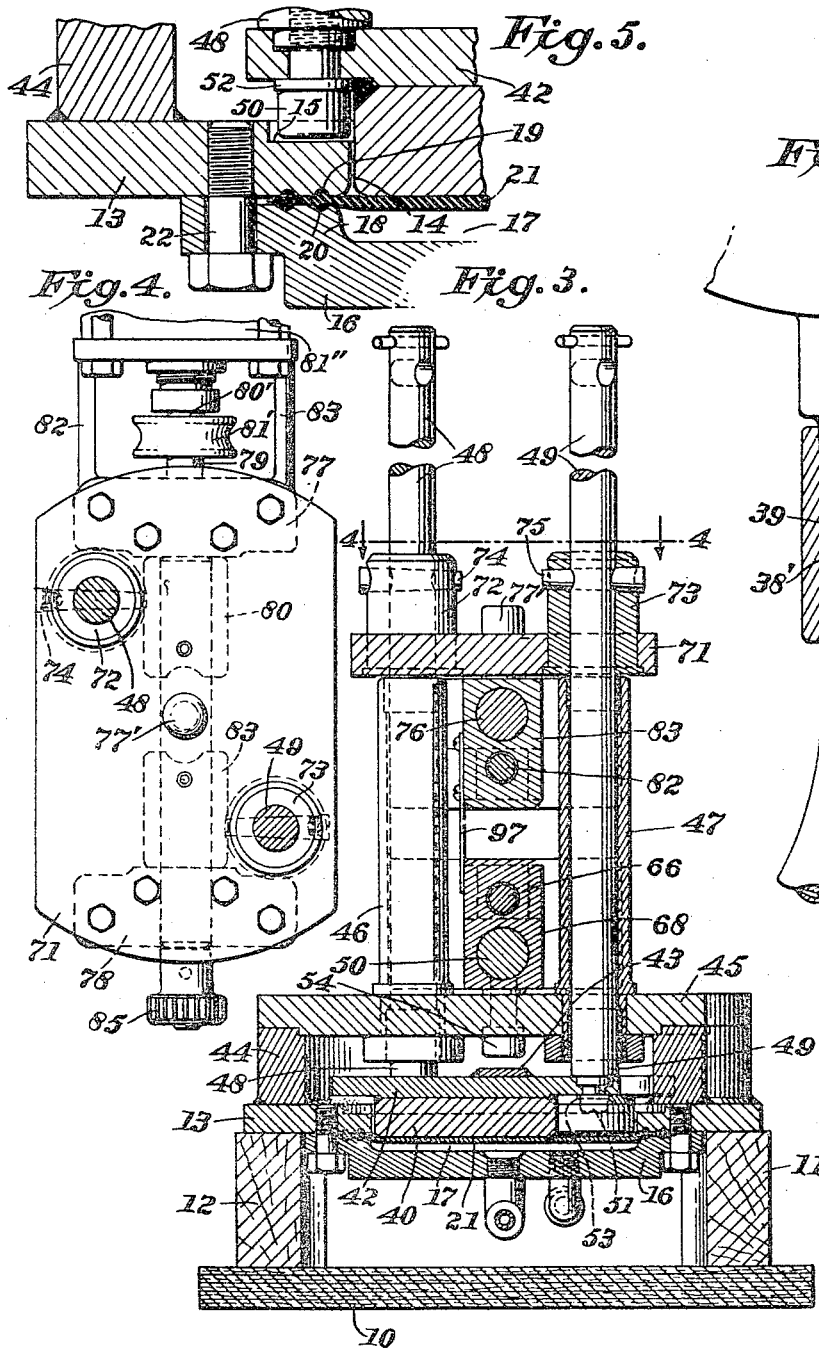
Inventor:
Alexander J. Golick, Patented Aug. 19, 1947

2,425,931

UNITED STATES PATENT OFFICE 2,425,931

HYDRAULIC TENSILE TESTING MACHINE

Alexander J. Golick, Seattle, Wash., assignor, by mesne assignments, to Monsanto Chemical Company, Seattle, Wash., a corporation of Delaware Application October 19, 1945, Serial No. 623,375

5 Claims. (Cl. 73—97)

This invention relates to apparatus for testing materials and, in particular, for testing the tensile strength of strips of material by pulling the strips in two. A main object of the invention is to provide testing apparatus which is rapid and accurate in operation and, at the same time, of relatively simple construction. Illustrative apparatus is shown in the accompanying drawings, in which:

Figure 1 is a section taken in a vertical axial plane, certain parts appearing in elevation, Figure 2 is a section substantially on line 2—2 of Figure 1, Figure 3 is a section substantially on line 3—3 of Figure 1, Figure 4 is a section on line 4—4 of Figure 3, Figure 5 is an enlarged section substantially on line 5—5 of Figure 2, and Figure 6 is a fragmental view particularly showing a pressure snubbing device in axial section.

Referring to the drawings, reference numeral 10 designates a base plate and reference numerals 11 and 12 parallel blocks secured on top of the base plate. Reference numeral 13 designates a plate secured across members 11 and 12 and having a central circular opening 14 whose lower edge is chamfered, the top of the plate being rabbeted around the opening to provide an annular recess having a bottom wall 15. Secured to the bottom of plate 13 by bolts 22 is a circular cap 16 having a circular cavity 17 substantially registering with the opening 14 and rimmed by an annular shoulder 18, the inner edge of the shoulder being chamfered.

The opposed faces of the plate 13 and shoulder 18 are provided with registering annular grooves, of which those designated at 19 and 20 lie opposite each other and closely adjacent the edges of the opening 14 and cavity 17. Clamped between the said opposed surfaces is a circular flexible diaphragm 21, here indicated as being of rubber or rubber-like composition. In assembly, the diaphragm is disposed in unflexed position on the top surface of shoulder 18, brought against the marginal portion of plate 13, and bolts 22 are applied and tightened. Ordinarily, the squeezing of the marginal portion of the diaphragm due to the clamping action would cause the diaphragm material to flow radially inwardly, thus distorting the active or exposed portion of the diaphragm. However, by providing the grooves as at 19 and 20 closely adjacent the inner clamping line, the displaced material is forced to flow, at least in large part, outwardly into the grooves, as indicated in Fig. 5, thus avoiding distortion of the active part of the diaphragm.

An elbow 23 threaded in an opening in cap 16 connects cavity 17 through a tube 24 with a valve 25. A T 26, threaded into a central opening in cap 16, is in connection at one end through a tube 27 with a three-way valve 28 having a pivoted control handle 29. A tube 30 leading from a source of hydraulic pressure, which may be simply the city supply, is connected into one side of a throttle valve 31, which may be a needle valve, whose other side is led through a connection 32 into the inlet port of valve 28. The other port of valve 28 goes to waste through a pipe 33. By swinging handle 29 to the right, Figure 2, from its illustrated shut-off position, water under pressure, as controlled by valve 31, is supplied to cavity 17 beneath the diaphragm. When handle 29 is swung to the left of the illustrated shut-off position, pipe 27 is placed in connection with pipe 33 for release.

The other end of T 26 is in connection through a pipe 34 and a snubbing device 35 with a pressure gauge 36 which, in addition to the usual pointer 37, is equipped, in known fashion, with a rider pointer. When pointer 37 is moved under applied pressure it carries the rider with it throughout its travel, the rider remaining in its farthest advanced position as pointer 37 returns. After taking the reading the rider can be manually returned.

The snubbing device 35 comprises a tubular body 35' having a bore 37' and a smaller counterbore 38' whose upper edge serves as a seat for a ball 39 whose diameter is substantially less than that of bore 37'. Counterbore 38' is longitudinally scored so that when ball 39 is seated, minute passages exist between it and the seat. It will be evident that while fluid can flow freely unwardly through the snubbing device, return flow is greatly restricted.

Disposed in opening 14 of plate 13 is a circular piston or platen 40, the diameter of the piston being less than that of opening 14 by twice the thickness of the diaphragm, which may conveniently be one-sixteenth inch, so that clearance is provided for free vertical movement of the piston. The lower edge of the piston is chamfered to avoid injury to the diaphragm against which it normally rests. Secured coaxially to the top of the piston is a circular plate 42 of larger diameter, and secured on top of plate 42 at its center is a stop block 43.

Reference numeral 44 designates a ring secured on plate 13 coaxially with opening 14 and supporting a circular plate 45. The latter is provided with vertical bores in which are secured the lower ends of tubes 46 and 47 which serve as guides for rods 48 and 49, being equipped at their ends with soft metal bushings. The lower ends of rods 48 and 49 are reduced and set in circular recesses in the overhanging margin of plate 42, counterbores below the recesses passing cap screws 50, Figure 5, and 51, Figure 3, which are threaded into the lower ends of the rods and against spacing washers 52 and 53. In the normal position of parts shown in Figures 1 and 3 the heads of the cap screws rest on surface 15 of plate 13, and depending on the thickness of washers 52 and 53 the diaphragm will be more or less downwardly flexed.

Secured on top of plate 45 through a central screw 54, whose head is directly above stop block 43, and a spacer 55 is a round bar 56 whose ends are received in openings in blocks 57 and 58, the axis of bar 56 being in the vertical plane of the horizontal axis of T 26, Figure 2, so that its ends are on opposite sides of the vertical rods 48 and 49. Block 57 has a bore parallel to bar 56 thereabove and slidably receiving a shaft 59 having an inner threaded end engaged with a jaw 60 which is slidably mounted on bar 56, the jaw having secured to its inner end a face plate 61 with downwardly directed teeth. At its outer end shaft 59 has a head engaged in a coupling 62 by which it is swiveled to an aligned piston 63 connected with a piston, not shown, in a cylinder 64 which is supported by arms as at 65, Figure 1, projecting outwardly of block 57. The piston is yieldingly held to the left by suitable spring means so that the jaw 60 is held in retracted position. By rotating shaft 59 through coupling 62 the threaded engagement between shaft 59 and 60 will cause axial movement of the latter so that it can be adjusted to a desired normal or starting position.

Rotatable in a bore in block 58 in alignment with shaft 59 is a shaft 66 which is equipped with a thrust collar 67 working against a surface at the inner end of the block. The shaft has a threaded inner end engaged with a jaw 68 slidable on bar 56, the inner end of the jaw being equipped with a face plate 69 having downwardly faced teeth. Shaft 66 has an outwardly projecting end on which is fixed a knob 70. By turning the knob, jaw 68 can be adjusted to a desired normal or starting position. Jaw 69 is directly opposite jaw 61 and between them is a space S for the reception of the lower end of a strip to be tested.

Reference numeral 71, Figures 1 and 3, designates a cross-head in the form of a plate having set therein thimbles 72 and 73 through which rods 48 and 49 pass, the thimbles having transverse openings for the reception of pins 74 and 75 adapted to be inserted through transverse openings in rods 48 and 49 so as to secure the cross-head to the rods at a selected height. Secured beneath cross-head 71 by means of a screw 77' and spacer 78' is a bar 76 parallel to and directly above bar 56. The ends of the bar are received in openings in blocks 77 and 78 secured beneath the cross-head. Disposed in a bore in block 77 below and parallel to bar 76 is a shaft 79 threaded in a jaw 80 which is slidable on the bar directly above jaw 60, jaw 80 including a face plate 81 with upwardly directed teeth. The outer end of shaft 79 is swiveled to a piston rod 80 through a coupling 81, the piston rod being in connection with a piston, not shown, in a cylinder 81' supported by arms 82 and 83, Figures 1 and 4, projecting outwardly from block 77, the piston being spring urged to the left, Figure 1. Block 77 mounts a shaft 82 coaxial with shaft 79 and threaded in a jaw 83 slidable on bar 76, the jaw having an end face 84 with upwardly directed teeth, the jaw being directly opposite jaw 80 and above jaw 68 and being adjustable like the latter through a knob 85, a space S' normally existing between the opposed jaws for the upper end of strip to be tested.

In Figure 2, reference numeral 88 designates a three-way valve having an inlet port in connection with a pipe 89 leading from a source of compressed air. The valve has a pivoted operating handle 90 of the same length as handle 29 and in connection therewith through a detachable link 91 to provide a parellelogram arrangement so that when either of the handles is swung the other will be simultaneously and similarly swung. When handle 90 is swung to the right from the shut-off position shown in Figure 2, the inlet port of valve 88 is placed in connection with an outlet port which through a tube 92, T 93 and tubes 94 and 95, is in connection with the cylinders 64 and 81'. When handle 90 is swung to the left from shut-off position, the said outlet port is placed in connection with a second outlet port which goes to waste through a tube 96.

The described gripping devices and drive therefor are not claimed per se herein, being disclosed in the application of Lawshe and Gardiner filed December 27, 1944, Ser. No. 569,942.

In preparing the apparatus for use, valve 25 is opened, the gauge is uncoupled from the snubber, and line 91 is detached so that valve 28 can be operated without affecting valve 88. Valve 28 is then opened so that water is supplied beneath diaphragm 21, air escaping through valve 25 and line 34. When flow of water occurs past valve 25 it may be closed and when water overflows the snubber 35, valve 29 is returned to shut-off position, link 91 is replaced, and the gauge is recoupled with the snubber.

Reference numerals 86 and 87 designate positioning blocks extending across bars 56 and 76 in the spaces S and S', the blocks having parallel opposed faces. Reference letter P designates a test strip, here shown as a strip of three-ply plywood provided with opposite kerfs extending through two of the plies, the strip being of such length that it will remain upright when inserted between the positioning blocks 86 and 87.

With the strip or test specimen in position, jaws 68 and 83 are advanced until the jaw teeth engage the strip. The jaw teeth should be in the same vertical plane and this can be determined by lining up a pointer 97 carried by jaw 83, Figure 3, with a mark on jaw 68. When either of handles 29 and 90 is now swung to the right, Figure 2, valves 28 and 88 are opened with the result that air under pressure goes instantaneously to cylinders 64 and 81' so that jaws 60 and 80 are driven against the ends of the strip P and they are securely gripped between the opposed sets of teeth. The opening of valve 28 causes water to be supplied to cavity 17 but with a retarded effect as compared to the action of the compressed air and consequently although both valves are simultaneously opened the strip will be gripped well before hydraulic action occurs. As the diaphragm is moved upwardly, thereby moving upwardly the upper set of jaws, the applied pressure is indicated on the gauge and when the strip snaps, the maximum reading will be held by pointer 38. Up to the snapping point the pressure has free access to the gauge through the snubber, but when the strip ruptures, ball 39 seats with snubbing effect, thus preventing a violent return of pointer 37 such as could cause injury to the gauge.

The function of needle valve 31 is to throttle the rate of supply to a low point so as to avoid an excessively fast or jerky movement of the gauge pointer 37. Once it has been adjusted to obtain the correct smooth rate of movement, it is not disturbed until changing service pressure or a different strength range in the sheer test pieces make a readjustment desirable.

As soon as the piece being tested has broken, the valve handles are moved to the left to cut off the supply and connect cavity 17 and cylinders 64 and 81' to waste.

The small amount of water required to rupture the test piece is then free to be pressed out of cavity 17 by the suspended weight, the hydraulically operated parts return to starting position, and the valves are turned to shut-off position. The piping is so small that while valve 28 is in waste position no water will be lost from the system except the small amount that is actually pushed out by the returning piston. The broken piece is then removed and a new piece inserted and the cycle repeated.

The required movement of the diaphragm is very slight, being of the order of 0.050 in., and generally even less. In practice, it has proved important to adjust the position of the piston with reference to the diaphragm so that when the piston has reached the point where most of the specimens are likely to break, the rubber will not then be in a stretched or flexed condition. This eliminates error which would otherwise arise due to the elasticity of the rubber exerting a force which would cause a false increment in the pressure reading. Taking this fact into consideration, the washers 52 and 53 are of such thickness that when the heads of screws 50 and 51 rest on surface 15 for the support of the piston and parts carried thereby, the diaphragm is so flexed that in its upward movement most of the specimens will snap at the point at which the diaphragm becomes flat, as shown in Figure 5.

While I have disclosed herein the at present preferred embodiment of the invention, it will be understood that variations in the form and arrangement of parts are possible and contemplated under the claims which follow.

I claim:

1. Apparatus for testing the tensile strength of a strip of material by pulling it in two, comprising a pair of gripping devices arranged to grip longitudinally spaced portions of a strip to be tested, a cap member having a cavity bounded by an annular rim portion, a ring portion secured to said rim portion, a diaphragm clamped between said portions, a piston in said ring portion normally resting against said diaphragm, means connecting said piston and one of said gripping devices whereby movement of the piston enforced by said diaphragm is imparted to said one of said devices to move the same away from the other gripping device, a pressure gauge, and a line in connection with said cavity and with said gauge whereby hydraulic fluid under pressure supplied to said cavity displaces the diaphragm to cause the rupturing of said strip.

2. Apparatus for testing the tensile strength of a strip of material by pulling it in two, comprising a pair of gripping devices arranged to grip longitudinally spaced portions of a strip to be tested, a cap member having a cavity bounded by an annular rim portion, a ring portion secured to said rim portion, a diaphragm clamped between said portions, a piston in said ring portion normally resting against said diaphragm, means connecting said piston and one of said gripping devices whereby movement of the piston enforced by said diaphragm is imparted to said one of said devices to move the same away from the other gripping device, a pressure gauge, a line in connection with said cavity and with said gauge whereby hydraulic fluid under pressure supplied to said cavity displaces the diaphragm to cause the rupturing of said strip, a valve in said line adjustable to open the line or to connect said cavity to waste, and a throttling valve in said line.

3. Apparatus for testing the tensile strength of a strip of material by pulling it in two, comprising a pair of gripping devices arranged to grip longitudinally spaced portions of a strip to be tested, a cap member having a cavity bounded by an annular rim portion, a ring portion secured to said rim portion, a rubber diaphragm clamped between said portions, at least one of said portions having an annular groove on its clamping face closely adjacent its inner edge into which the diaphragm material can flow due to clamping pressure and so minimize inward radial flow of the material whereby distortion of the active portion of the diaphragm due to clamping pressure is substantially avoided, a piston in said ring portion normally resting against said diaphragm, a pressure gauge, a line in connection with said cavity and with said gauge, and means connecting said piston and one of said gripping means for transmitting to the latter movement of the piston caused by movement of the diaphragm when hydraulic fluid is supplied under pressure to said cavity and thereby move said one of said devices away from the other to cause the rupturing of said strip.

4. Apparatus for testing the tensile strength of a strip of material by pulling it in two, comprising a pair of gripping devices arranged one above the other and adapted to grip longitudinally spaced portions of a strip to be tested, means defining an upwardly faced chamber below said devices, a flexible diaphragm clamped horizontally across the chamber and dividing the chamber into upper and lower portions of which the lower is closed, a piston in the upper chamber portion normally resting against said diaphragm, means extending upwardly from said piston and in connection with the upper gripping device whereby movements of the piston are imparted to said upper device to move the same relative to the lower gripping device, a pressure gauge, and a hydraulic pressure line in connection with the lower chamber portion and with said gauge.

5. Apparatus for testing the tensile strength of a strip of material by pulling it in two, comprising a pair of gripping devices arranged one above the other and adapted to grip longitudinally spaced portions of a strip to be tested, means defining an upwardly faced chamber below said devices, a flexible diaphragm clamped horizontally across the chamber and dividing the chamber into upper and lower portions of which the lower is closed, a piston in the upper chamber portion normally resting against said diaphragm, means extending upwardly from said piston and in connection with the upper gripping device whereby movements of the piston are imparted to said upper device to move the same relative to the lower gripping device, means supporting the weight of the piston and superimposed gripping device and connecting means with the diaphragm normally flexed to such an extent that movement of the diaphragm to a position in which it is substantially unflexed will normally suffice to rupture the strip, a pressure gauge, and a hydraulic pressure line in connection with the lower chamber portion and with said gauge.

ALEXANDER J. GOLICK.

REFERENCES CITED

The following references are of record in the file of this patent:

UNITED STATES PATENTS

| Number | Name | Date |
| --- | --- | --- |
| 570,970 | Tomkins | Nov. 10, 1896 |
| 1,848,468 | Emery, Jr. | Mar. 8, 1932 |
| 2,125,483 | Blanchard | Aug. 2, 1938 |